(12) United States Patent
Brabbs et al.

(10) Patent No.: US 10,895,036 B2
(45) Date of Patent: Jan. 19, 2021

(54) COMPOSITE COMPRISING A NONWOVEN VAPOR PERMEABLE SHEET

(71) Applicant: DUPONT SAFETY & CONSTRUCTION, INC., Wilmington, DE (US)

(72) Inventors: Noel Stephen Brabbs, Garnich (LU); Eric Huebsch, Medingen (LU); Norbert Frey, Luxembourg (LU)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 64 days.

(21) Appl. No.: 16/086,388

(22) PCT Filed: May 11, 2017

(86) PCT No.: PCT/US2017/032101
§ 371 (c)(1),
(2) Date: Sep. 19, 2018

(87) PCT Pub. No.: WO2017/200831
PCT Pub. Date: Nov. 23, 2017

(65) Prior Publication Data
US 2019/0119847 A1 Apr. 25, 2019

Related U.S. Application Data

(60) Provisional application No. 62/338,088, filed on May 18, 2016, provisional application No. 62/504,588, filed on May 11, 2017.

(51) Int. Cl.
*D06N 5/00* (2006.01)
*D06M 11/83* (2006.01)
(Continued)

(52) U.S. Cl.
CPC ............... *D06N 5/00* (2013.01); *B32B 5/022* (2013.01); *D06M 11/83* (2013.01);
(Continued)

(58) Field of Classification Search
None
See application file for complete search history.

(56) References Cited

U.S. PATENT DOCUMENTS 3,081,519 A 3/1963 Blades et al.
3,169,899 A 2/1965 Steuber
(Continued)

FOREIGN PATENT DOCUMENTS

| EP | 1400348 A2 | 3/2004 |
| WO | 0128770 A1 | 4/2001 |
| WO | 2014/025774 A1 | 2/2014 |

OTHER PUBLICATIONS

International Search Report dated Aug. 19, 2017, for corresponding International Application No. PCT/US2017/032101, filed May 11, 2017.
(Continued)

*Primary Examiner* — Shawn Mckinnon
*Assistant Examiner* — Lashawnda T McKinnon

(57) ABSTRACT

A composite laminate comprising at least one moisture vapor permeable nonwoven sheet having first and second surfaces and a fluorinated polymeric coating on the first surface of the sheet wherein (i) the fluorinated polymeric coating is present in an amount such that the total fluorine content of the coated non-woven sheet is 0.05 to no greater than 0.4 gsm, and (ii) the composite laminate, after exposure to wet timber, exhibits a retained hydrohead of at least 60 percent.

8 Claims, 5 Drawing Sheets

FIG. 1E

(51) Int. Cl.
*D06N 7/00* (2006.01)
*E04B 1/62* (2006.01)
*E04D 12/00* (2006.01)
*E04D 13/16* (2006.01)
*B32B 5/02* (2006.01)

(52) U.S. Cl.
CPC ........... *D06N 7/0094* (2013.01); *E04B 1/625* (2013.01); *E04D 12/002* (2013.01); *E04D 13/16* (2013.01); *B32B 2255/205* (2013.01); *D06N 2209/123* (2013.01); *Y10T 428/24917* (2015.01); *Y10T 442/655* (2015.04)

(56) References Cited

U.S. PATENT DOCUMENTS

| | | |
|---|---|---|
| 3,227,784 A | 1/1966 | Blades et al. |
| 3,851,023 A | 11/1974 | Brethauer et al. |
| 4,974,382 A | 12/1990 | Avellanet |
| 4,999,222 A | 3/1991 | Jones et al. |
| 5,418,006 A * | 5/1995 | Roth ................ C07C 63/72 427/154 |
| 2006/0040091 A1 | 2/2006 | Bletsos et al. |
| 2008/0057292 A1* | 3/2008 | Bletsos ................ B32B 5/26 428/315.9 |
| 2008/0187740 A1* | 8/2008 | Bletsos ................ B32B 5/022 428/306.6 |

OTHER PUBLICATIONS

McQuaker Analytical Chemistry, 1979, 51 (7), pp. 888-895.

\* cited by examiner

COMPOSITE COMPRISING A NONWOVEN VAPOR PERMEABLE SHEET

BACKGROUND

1. Field of the Invention

This invention relates to a composite laminate comprising a nonwoven plexifilamentary polyolefinic sheet and a fluoropolymer coating suitable for use as a water impermeable membrane in buildings.

2. Description of Related Art

Polyolefinic nonwoven sheets are finding increasing uses as membranes in the roofs and walls of buildings to allow moisture vapor to pass through the sheet, thus preventing moisture condensation in insulation that is installed behind the sheet, while at the same time providing a barrier to air and liquid water and enhancing the energy efficiency of the building.

When membranes come in contact with timber which becomes wet or humid, it is possible that the contact area and adjacent areas can show compromised resistance to penetration of water thereafter. This effect can be especially severe when the membrane comes in contact with timber which has been treated with wood preservative and could compromise the water-tightness of the building.

US Patent Application Publication no. 2006/0040091 to Bletsos et al. discloses a moisture vapor permeable metalized composite sheet that is formed by coating a moisture vapor permeable sheet—with at least one metal layer and at least one outer organic coating layer. The moisture vapor permeability of the composite sheet is at least about 80% of the moisture vapor permeability of the starting sheet. The composite sheet provides a barrier to air and liquid water infiltration while having high moisture vapor permeability and good thermal barrier properties. The composite sheet material is suitable for use as a building construction wrap such as roof lining and house wrap.

U.S. Pat. No. 4,999,222 to Jones et al. describes a metallized high specular gloss polyethylene plexifilamentary film-fibril sheet with very low emissivity that is made by a process of calendering a polyethylene film-fibril sheet between a smooth metal roll and a soft, resilient roll to form a sheet of high specular gloss, followed by vacuum metallization of the smooth high specular gloss surface. Such metallized sheets are useful as radiant barriers or roof liners for energy savings purposes.

U.S. Pat. No. 4,974,382 to Avellanet describes an infiltration and energy barrier comprising a flexible substrate sheet having at least one metalized layer thereon that is applied to a structure in a substantially continuous manner and is disposed between the structural underlayment and the finish material to enhance the energy efficiency of the structure. In accordance with the desired application, the infiltration and energy barrier may be either impermeable or vapor permeable.

Published PCT International Application No. WO 01/28770 to Squires et al. describes breathable building membranes that include an under layer of microporous film and a top layer formed of a filamentous polymeric fabric, for example a spunbond fabric, which is provided with a moisture vapor permeable reflective metal coating.

Published European Patent Application No. EP 1400348 to Avril et al. describes liquid impermeable, moisture vapor/gas permeable laminated fabrics that are suitable for use as construction fabrics such as house wrap and roofing underlay that include a reflective film layer formed by vapor depositing a metal layer on a first polymeric film layer and sandwiching the metal layer between the first polymeric film layer and a second polymeric film layer. The film layers protect the metal layer from damage during use, but are moisture impermeable and are microperforated after metallization to provide the desired moisture vapor permeability.

There remains an ongoing need to provide breathable membranes for the building construction industry that are not adversely affected when in contact with wet timber. Such a solution is particularly useful during the construction phase of a building but is also effective post construction when the building structure is damaged by, for example, missing tiles.

SUMMARY OF THE INVENTION

This invention pertains to a composite laminate comprising at least one moisture vapor permeable nonwoven sheet having first and second surfaces and a fluorinated polymeric coating on the first surface of the sheet wherein (i) the fluorinated polymeric coating is present in an amount such that the total fluorine content of the coated non-woven sheet is 0.05 to no greater than 0.4 gsm, and (ii) the composite laminate, after exposure to wet timber, exhibits a retained hydrohead of at least 60 percent when tested according to Test Method A.

DETAILED DESCRIPTION

Terms

Figure 1A:
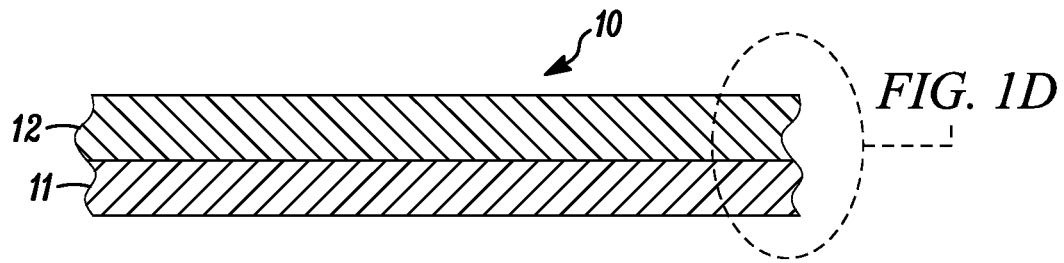
FIGS. 1A to 1C are schematic diagrams of embodiments of this invention.

The terms "nonwoven fabric", "nonwoven sheet", "nonwoven layer", and "nonwoven web" as used herein refer to a structure of individual strands (e.g. fibers, filaments, or threads) that are positioned in a random manner to form a planar material without an identifiable pattern, as opposed to a knitted or woven fabric. The term "fiber" is used herein to include staple fibers as well as continuous filaments. Examples of nonwoven fabrics include meltblown webs, spunbond nonwoven webs, flash spun webs, staple-based webs including carded and air-laid webs, spunlaced webs, and composite sheets comprising more than one nonwoven web.

The term "spunbond fibers" as used herein means fibers that are melt-spun by extruding molten thermoplastic polymer material as fibers from a plurality of fine, usually circular, capillaries of a spinneret with the diameter of the extruded fibers then being rapidly reduced by drawing and then quenching the fibers.

The term "meltblown fibers" as used herein, means fibers that are melt-spun by meltblowing, which comprises extruding a melt-processable polymer through a plurality of capillaries as molten streams into a high velocity gas (e.g. air) stream.

The term "spunbond-meltblown-spunbond nonwoven fabric" ("SMS") as used herein refers to a multi-layer composite sheet comprising a web of meltblown fibers sandwiched between and bonded to two spunbond layers. Additional spunbond and/or meltblown layers can be incorporated in a composite laminate, for example spunbond-meltblown-meltblown-spunbond webs ("SMMS"), etc.

The term "microporous film laminate" ("MPF") as used herein refers to a multi-layer composite sheet comprising a thin polymer film having in it a plurality of micropores which allow water vapour to pass, this microporous film being laminated to a reinforcing web of spunbond fibers.

The term "plexifilamentary" as used herein, means a three-dimensional integral network or web of a multitude of thin, ribbon-like, film-fibril elements of random length and with a mean film thickness of less than about 4 microns and a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network. A nonwoven web of plexifilamentary film-fibril elements is referred to herein as a "flash spun plexifilamentary sheet".

As used herein, the term "metal" includes metal alloys as well as metals.

The term "wall system" is used herein to refer a wall in a building construction. A wall system includes internal lining and outer skin layers, and other wall elements intermediate the internal lining and outer skin layers. The intermediate elements can include supporting frame elements such as vertical wooden studs, at least one air space, insulation material, optional vapor barrier layer, and a moisture vapor permeable metalized composite sheet of the present invention.

The term "roof system" is used herein to refer to a roof in a building construction. A roof system includes supporting roof frame elements such as pitched wooden rafters, external roofing material and other roof elements. Roof systems can be classified as warm roof systems and cold roof systems. In a cold roof system, the other roof elements can include optional vapor barrier layer, at least one air space (which can be the attic air space), elements intermediate the supporting roof frame elements and the external roofing material such as battens or solid sheathing, a moisture vapor permeable metalized composite sheet of the present invention, and insulation material installed at the floor level of the attic space, above the interior ceiling level. In a warm roof system, the other roof elements can include, in addition to those listed for a cold roof system, an attic ceiling and insulation installed above the attic ceiling (instead of at the floor level of the attic space). The other roof elements can be intermediate the supporting roof frame elements and the external roofing material, or attached to the side of the supporting roof frame elements facing towards the attic space, or installed between adjacent roof frame elements, etc., depending on the specific roof element.

Composite Laminate

Figure 1B:
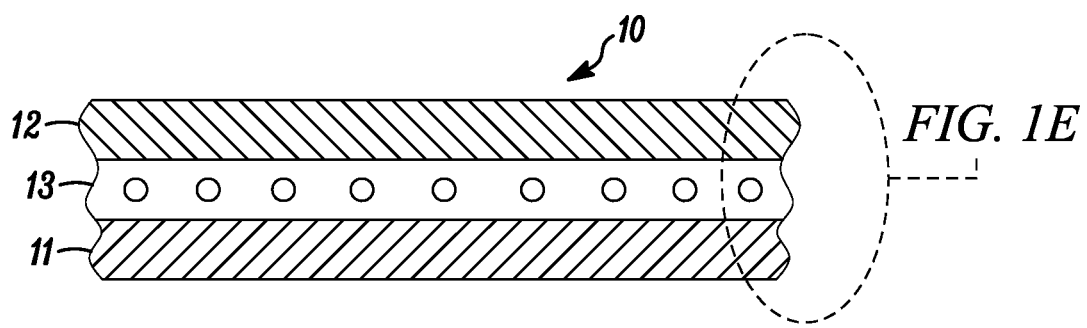
Figure 1C:
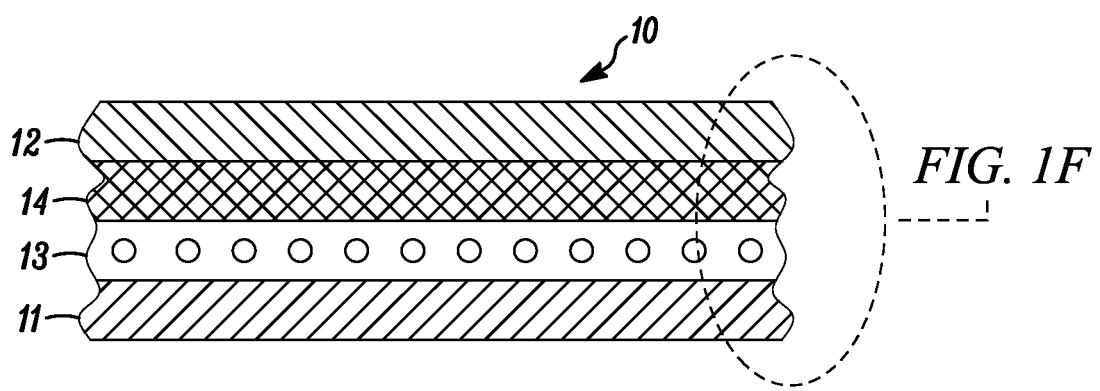
Figure 1D:
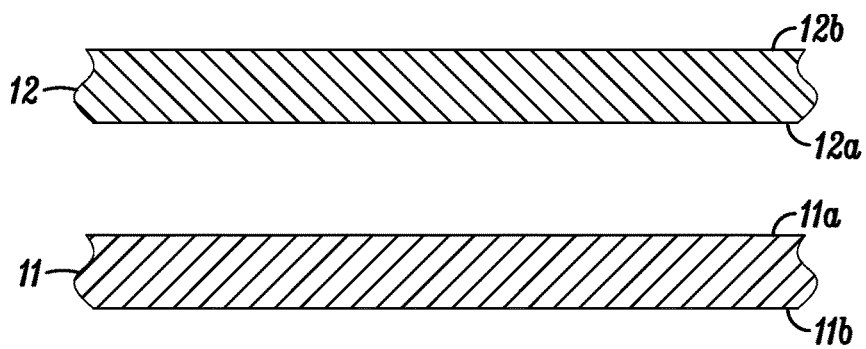
FIGS. 1D to 1F show, in an exploded view, further features of FIGS. 1A to 1D

In one embodiment, as shown in FIGS. 1A and 1D, a composite laminate 10 comprises a moisture vapor permeable nonwoven sheet 11 and a fluorinated polymeric coating 12 on the first surface 11a of sheet 11. The second surface of sheet 11 is 11b. The polymeric coating has a first surface 12a and a second surface 12b.

Figure 1E:
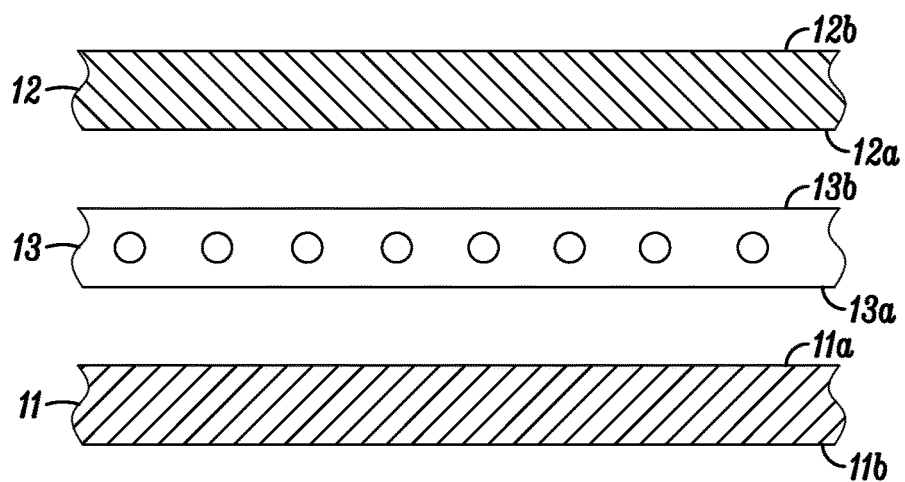

In another embodiment, as shown in FIGS. 1B and 1E, the composite laminate 10 comprises a moisture vapor permeable nonwoven sheet 11 and a layer of metal 13 having first and second surfaces 13a and 13b respectively with the first surface of the metallic layer 13a being adjacent to the first surface of the nonwoven sheet 11a. A fluorinated polymeric coating 12 is adjacent to the second surface 13b of the metallic layer 13.

Figure 1F:
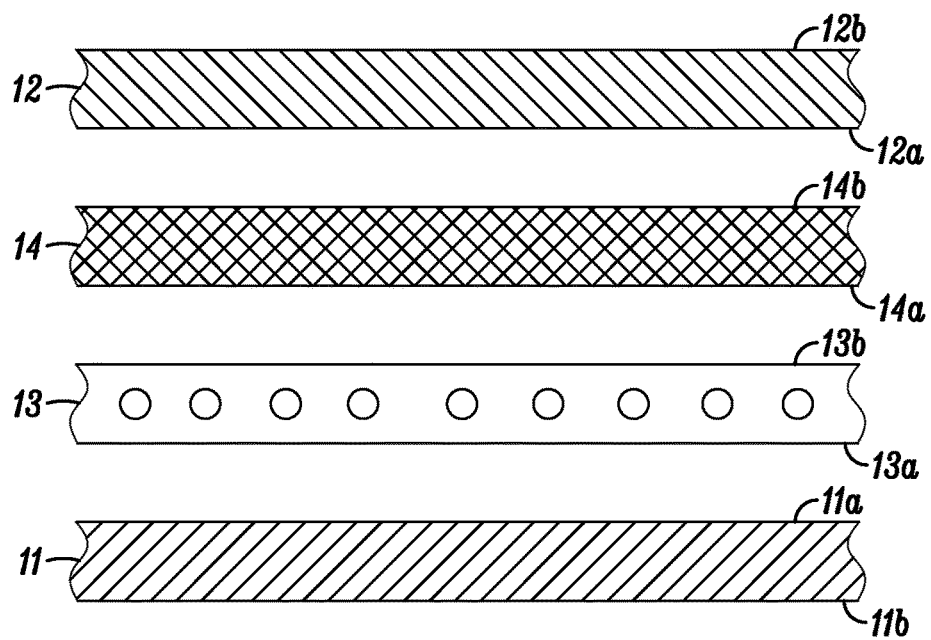

In yet another embodiment, as shown in FIGS. 1C and 1F, the composite laminate comprises a moisture vapor permeable nonwoven sheet 11, a layer of metal 13 having first and second surfaces 13a and 13b respectively with the first surface of the metallic layer 13a being adjacent to the first surface of the nonwoven sheet 11a and an anticorrosion layer 14 having first and second surfaces 14a and 14b respectively with the first surface 14a of the anticorrosion layer being adjacent to the second surface 13b of the metallic layer 13. A fluorinated polymeric coating 12 is adjacent to the second surface 14b of the anticorrosion layer 14.

Any of the above embodiments may further comprise a reinforcing support member. The reinforcing member may be in the form of a grid, or a nonwoven or woven fabric. The composition of the reinforcing member may be organic or inorganic. Preferably the support member is on the outside of the nonwoven sheet 11 in contact with the first surface 11b of the sheet. In an alternative embodiment the support member may be attached to the fluoropolymer coating surface 12b provided the support member is an open grid or fabric, that is to say one having open spaces so as not to cover much of the surface of the coating.

In one embodiment, after exposure to wet timber, the composite laminate exhibits a retained hydrohead of at least 60 percent when tested according to Test Method A. In other embodiments, the retained hydrohead is at least 80 percent or 90 percent or even 100%.

Nonwoven Sheet

The nonwoven sheet comprises plexifilamentary polyolefin fibers. The moisture vapor permeable plexifilamentary polyolefin sheet membrane 11 has first and second surfaces shown respectively as 11a and 11b in FIGS. 1D-1F.

In some embodiments, the nonwoven sheet has an areal weight of from 35 to 120 gsm and a thickness of from 50 to 500 micrometers.

Moisture vapor permeable nonwoven sheet layers suitable for forming composite laminates of the present invention can have a relatively low air permeability, such as between about 5 and about 12,000 Gurley seconds, even between about 20 and about 12,000 Gurley seconds, even between about 100 and about 12,000 Gurley seconds, and even between about 400 and about 12,000 Gurley seconds, which is generally considered to provide a barrier to air infiltration. Alternately, the moisture vapor permeable sheet layer can be selected to have a relatively high air permeability, for example those sheets having a Gurley Hill air permeability of less than 5 seconds, with the air permeability falling in the Frazier air permeability range. A composite sheet with a relatively high air permeability can have a moisture vapor permeability of at least about 35 g/m$^2$/24 hours, or at least about 200 g/m$^2$/24 hours, or even at least about 600 g/m.$^2$/24 hours, and a hydrostatic head of at least about 20 cm H$_2$O, or at least about 50 cm H$_2$O, even at least about 100 cm H$_2$O or even at least about 130 cm H$_2$O. When used as a house wrap, the composite sheet preferably has a tensile strength of at least about 35 N/cm.

Suitable moisture vapor permeable nonwoven sheet layers are sheets including flash-spun plexifilamentary sheets. Preferably, the sheets are formed from polyolefins such as polypropylene, polyethylene, polyesters or polyamides. High density polyethylene or polypropylene and preferred materials.

In one embodiment, the moisture vapor permeable non-woven sheet is a flash spun plexifilamentary polyolefin sheet such flash spun high density polyethylene, available from E. I. du Pont de Nemours and Company, Inc. (Wilmington, Del.) under the tradename Tyvek®. Suitable flash spun plexifilamentary film-fibril materials may also be made from polypropylene. The moisture vapor permeable sheet can be a laminate of a flash spun plexifilamentary sheet with one or more additional layers, such as a laminate comprising a flash spun plexifilamentary sheet and a melt-spun spunbond sheet. Flash spinning processes for forming web layers of plexifilamentary film-fibril strand material are disclosed in U.S. Pat. No. 3,081,519 (Blades et al.), U.S. Pat. No. 3,169,899 (Steuber), U.S. Pat. No. 3,227,784 (Blades et al.), U.S. Pat. No. 3,851,023 (Brethauer et al).

Polymeric Coating

The polymeric coating layer 12 is a continuous coating of fluoropolymer present on the surface of sheet 11 in an amount of from 0.05 to no greater than 1 gsm, such that the total amount of fluorine present in the coated non-woven sheet is from 0.05 to no greater than 0.4 gsm. The coating layer 12 has first and second surfaces 12a and 12b. If the coat weight is less than 0.05 gsm, or if the total amount of fluorine present is less than 0.05 gsm, there will be areas of discontinuity in the coating that leads to a defective composite laminate If the coating amount is greater than 1 gsm, or if the total amount of fluorine present is greater than 0.4 gsm, the composite laminate does not show any further improvement in its resistance to contact with wet timber and its breathability may be reduced. It was surprisingly found that a coat weight range of from 0.05 to no greater than 1 gsm provides a composite laminate with (i) adequate breathability of the nonwoven sheet membrane and (ii) high retained hydrohead after exposure to wet timber, whereas coat weight values considerably higher than this range applied to SMS or MPF substrates do not achieve the required properties.

In some embodiments, the fluoropolymer comprises fluorinated side-chains having six or fewer contiguous fluorine-bearing carbon atoms.

Suitable examples of fluoropolymer include fluoroalkyl acrylate homopolymers, fluoroalkyl acrylate copolymers, fluorinated siloxanes, fluorinated silicones, fluorinated urethanes and mixtures thereof. The fluoropolymers may preferably be supplied as dispersions or emulsions in water which may then be diluted to a suitable concentration for coating. Additional additives such as alcohols, surfactants, cross-linking agents and pH control agents may be added to the diluted fluoropolymer solution to control wetting and film formation if necessary.

The coating may be applied by any suitable method known in the art such as by spray coating, dip coating, gravure coating, the coating, curtain coating or knife coating followed by drying.

Metallic Layer

In some embodiments, the composite laminate 10 further comprises a reflective layer 13 of metal intermediate between the nonwoven sheet 11 and the polymeric coating 12, the metallic layer having an emissivity no greater than 0.25. The layer of metal 13 has first and second surfaces 13a and 13b (FIG. 1E) respectively with the first surface of the metallic layer 13a being adjacent to the first surface 11a of the nonwoven sheet.

Metals suitable for forming the metal layer of the composite laminate invention include aluminum, gold, silver, zinc, tin, lead, copper, and their alloys. The metal alloys can include other metals, so long as the alloy composition provides a low emissivity composite sheet. The metal layer has a thickness between about 15 nm and 200 nm, or between about 30 nm and 60 nm. In one embodiment, the metal layer comprises aluminum having a thickness between about 15 and 150 nm, or between about 30 and 60 nm. Methods for forming the metal layer are known in the art and include resistive evaporation, metal vapor deposition, electron beam metal vapor deposition, or sputtering. If the metal layer is too thin, the desired thermal barrier properties will not be achieved. If the metal layer is too thick, it can crack and flake off. Generally it is preferred to use the lowest metal thickness that will provide the desired thermal barrier properties. When the composite sheet of the present invention is used as a house wrap or roof lining, the metal layer reflects infrared radiation or emits little infrared radiation, providing a thermal barrier that reduces energy loss and keeps the building cooler in the summer and warmer in the winter.

The thermal barrier properties of the metal can be characterized by its emissivity. Emissivity is the ratio of the power per unit area radiated by a surface in equilibrium with its environment to that radiated by a black body at the same temperature. A black body therefore has an emissivity of one and a perfect reflector has an emissivity of zero. The lower the emissivity, the higher the thermal barrier properties. Each metal layer and adjacent outer anticorrosion and/or fluoropolymer coating layer is preferably deposited sequentially.

Preferably the metal layer is deposited under vacuum without exposure to air or oxygen so that there is no substantial oxidation of the metal layer. By minimizing the degree of oxidation of the aluminum by depositing the outer organic coating layer prior to exposing the aluminum layer to the atmosphere, the emissivity of the composite laminate is significantly improved compared to an unprotected layer of aluminum. The outer organic coating layer also protects the metal from mechanical abrasion during roll handling, transportation and end-use installation.

Anticorrosion Layer

In some embodiments, the composite laminate 10 further comprises a protective anticorrosion layer 14 having first and second surfaces 14a and 14b respectively. The positioning of the anticorrosion layer has been previously described in respect to FIGS. 1C and 1F.

The thickness and composition of this protective layer is selected such that it substantially changes neither the moisture vapor permeability of the reflective metallic sheet, nor the emissivity of the low emissivity metal layer to which it is applied. The protective layer preferably has a thickness between 0.2 and 2.5 microns and more preferably between 0.2 and 1.0 microns. The composition of the protective anticorrosion layer may be chosen among hydrophobic materials which will effectively protect the metal surface from attack by moisture and oxygen, provided they can be applied in a suitably thin layer as described above. Cross-linked polyacrylates and vinyl polymers have been found to be especially convenient as these can be applied in the form of low viscosity monomeric or oligomeric precursors and polymerized in situ by well-known thermal or radiation curing methods.

Building Wall System

Figure 2:
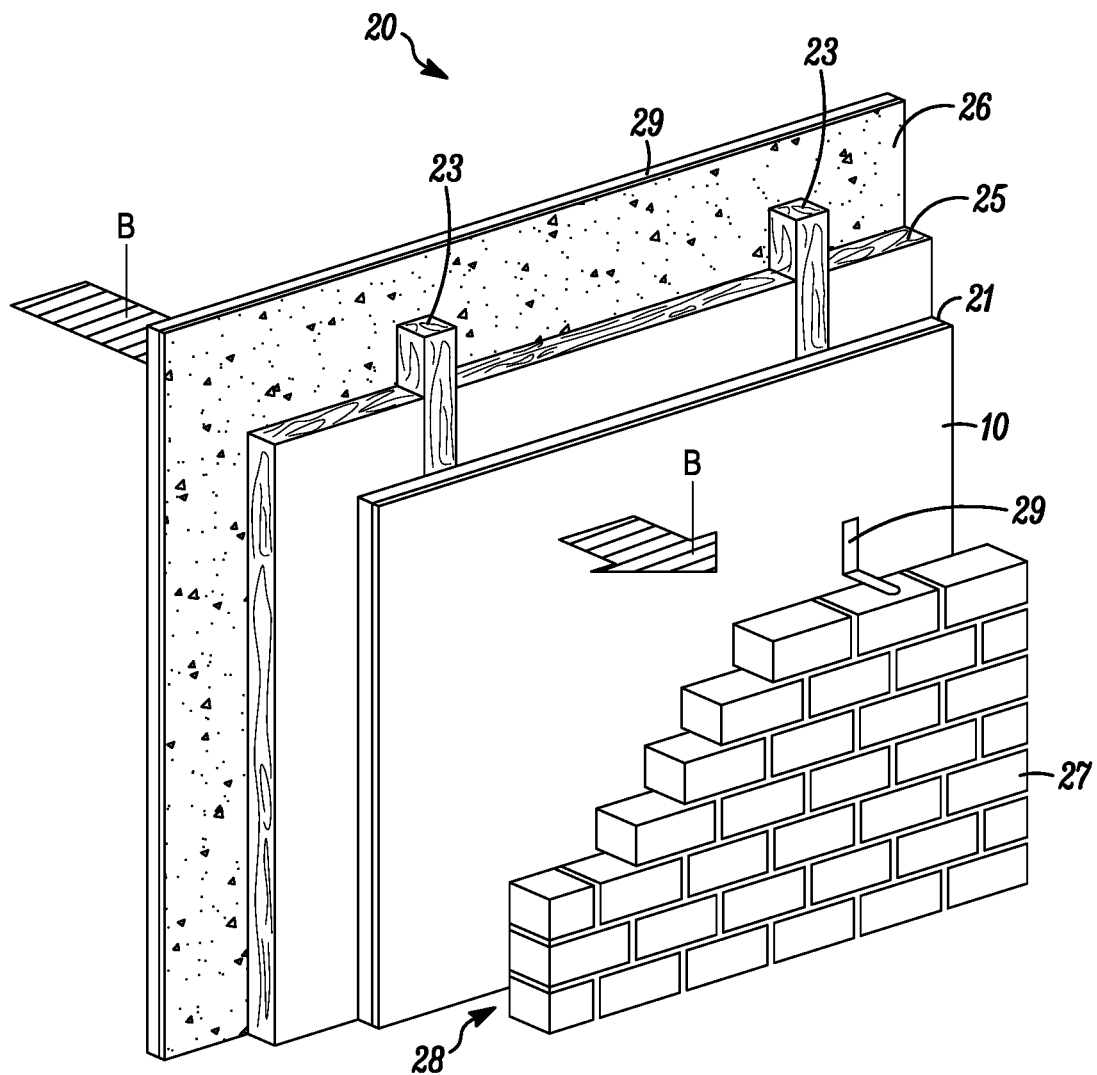
FIG. 2 is schematic diagram of one embodiment of a wall system according to the present invention.

FIG. 2 is a schematic diagram of a wall system 20 in a frame construction building that utilizes the composite laminate 10 of the present invention as a house wrap. Sheathing layer 21, such as plywood board or wooden planks, is attached to the outside of frame elements 23 that form the load-bearing frame of the building. Vertical frame elements 23 are typically formed of wood (e.g. wooden studs) but can be formed of metal in certain constructions. The composite laminate 10 is attached to the outer surface of sheathing 21. In some building constructions, sheathing 21 is not used and the composite laminate 10 is attached directly to frame elements 23. Outer skin 27, which forms the exterior of the building (e.g. brick, concrete block, fiber-reinforced cement, stone, etc.) is separated from the metalized composite sheet by metal straps 29 to form air space 28 therebetween. Wood strips or other spacing members can replace metal straps 29. The composite laminate is preferably installed such that the fluorinated coating layer 12 of the composite laminate 10 is in contact with the sheathing layer 21 and the second surface 11b of the nonwoven sheet is facing the air space. Internal lining 29 (e.g. plaster board) forms the interior wall of the building. Insulation 25 is installed in the wall between adjacent frame elements and between the internal lining and the sheathing layers (or between the internal lining and the composite laminate if a sheathing layer is not used). The wall structure optionally includes air leakage barrier and vapor barrier layer 26 intermediate the internal lining and insulation material. Layer 26 protects against convection heat loss and prevents excessive moisture, which is generated in the house, from penetrating into the insulation. The high moisture vapor permeability of the composite laminate allows water vapor to pass through the composite sheet in the direction of arrow "B" where it is dispersed in air space 28, thus preventing moisture condensation in the insulation. For composite laminates having low air permeability and high hydrostatic head, it also protects against wind and water penetration.

Roofing System

Figure 3A:
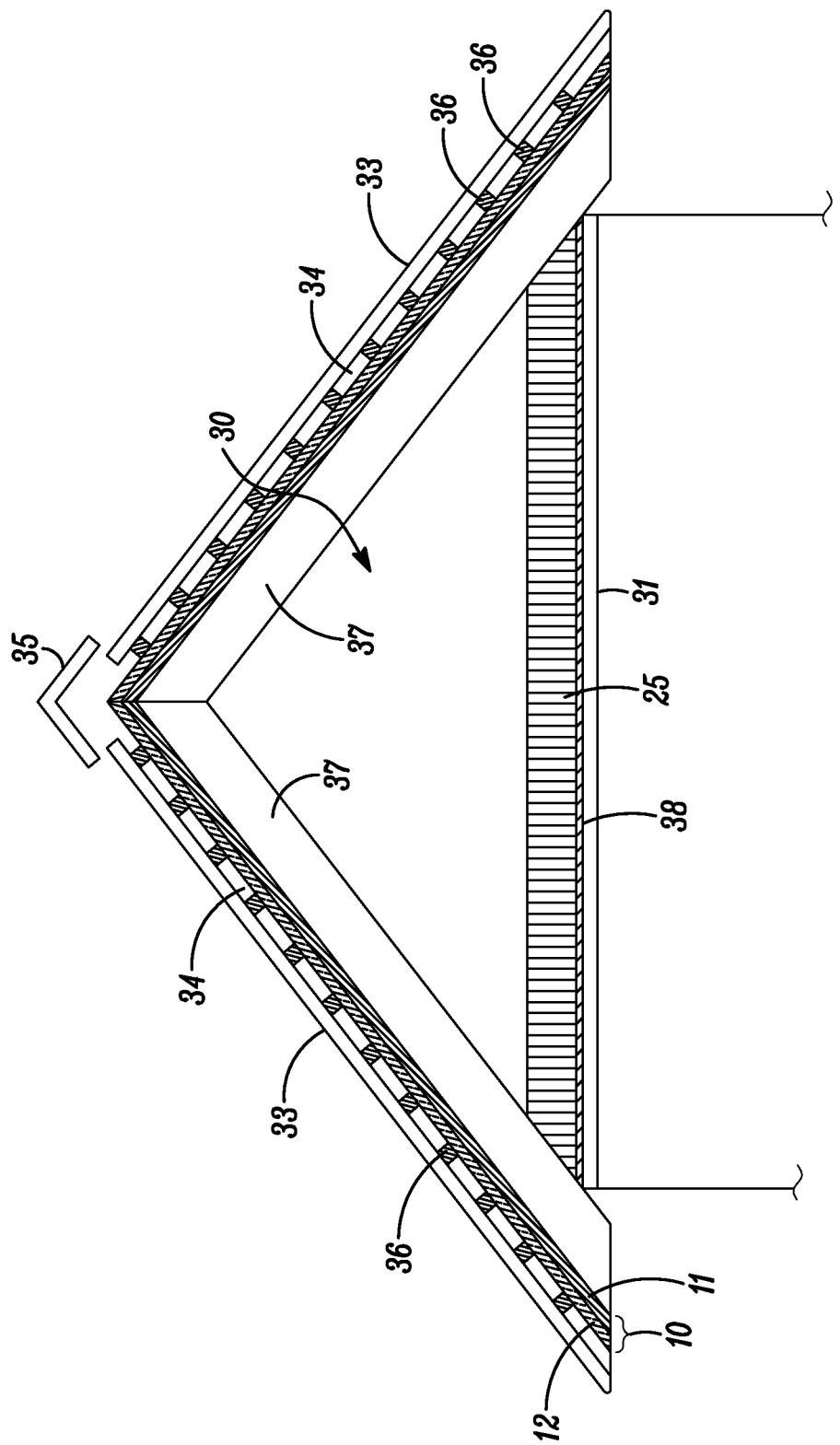
FIGS. 3A-3C are schematic diagrams of roof systems according to the present invention.
Figure 3B:
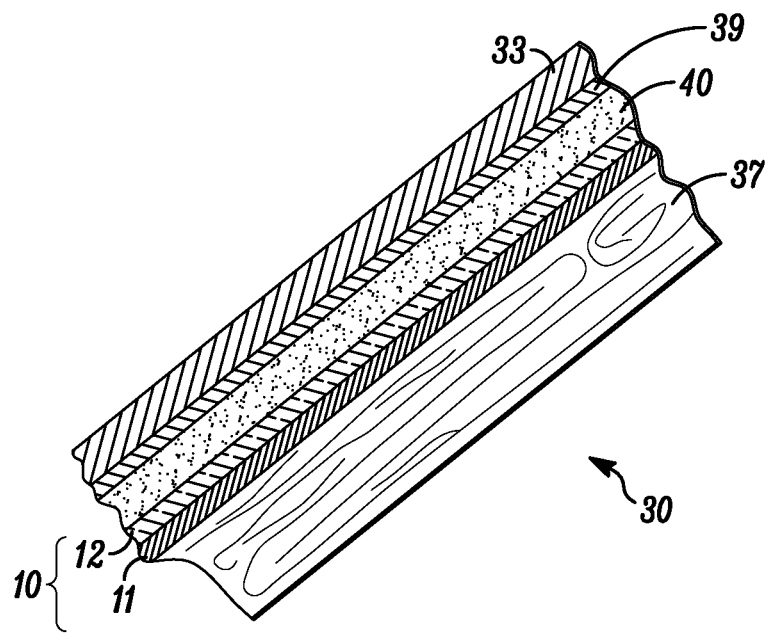
Figure 3C:
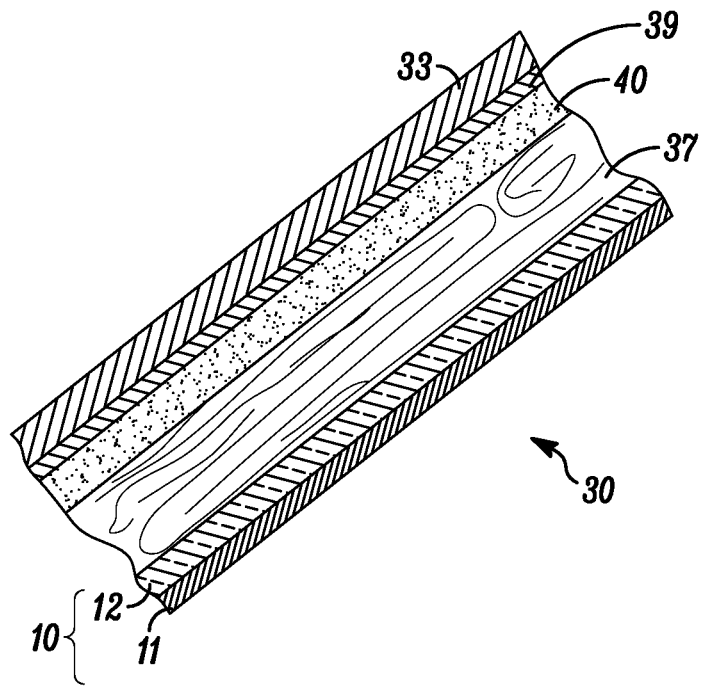

FIGS. 3A-3C are schematic diagrams of roof systems in frame construction buildings that include a composite laminate of the present invention. FIG. 3A illustrates an example of a "cold roof" system in which the interior attic space 30 is not habitable. The composite laminate 10 is installed above pitched roof frame elements (e.g. wooden rafters) 37. Insulation material 25 is installed between attic floor joists (not shown) above and adjacent to the level of interior ceiling 31. Optional vapor barrier 38 can be installed intermediate insulation 25 and interior ceiling 31. Spacing members (battens) 36 are placed adjacent the top surface of the composite laminate and external roofing material 33 (e.g. tiles, etc.) is installed on the spacing elements. There is a batten air space 34 above the composite laminate and between spacing elements (battens) 36 and the external roofing material. The ridge of the roof system is designated by 35. The composite laminate 10 is moisture vapor permeable and comprises at least a one moisture vapor permeable plexifilamentary nonwoven sheet 11 and a fluorinated polymeric coating 12.

FIG. 3B is a cross-section through a portion of a cold roof system that includes a fully boarded deck instead of a batten system. Composite laminate 10 is installed on top of roof rafters 37, preferably with the polyolefinic sheet 11 facing down towards the interior attic space 30. A solid roof deck 40 (e.g. plywood) is installed over the composite laminate 10 and the external roofing is installed over the solid decking. Examples of external roofing include asphalt-coated felt or other roofing underlayment material 39 with exterior roofing material 33 such as tiles or asphalt shingles placed over the roofing underlayment. In another embodiment of a fully boarded deck shown in FIG. 3C, the composite laminate 10 is attached to the underside of the roof rafters 37, with the nonwoven sheet 11 facing down facing down towards attic space 30.

Test Methods

Test Method A

Resistance to contact of the composite laminate with wet timber was evaluated by the method now described and hereinafter referenced as Test Method A. The resistance to water penetration (hydrohead) of the material to be tested is first measured several times to obtain an average starting value. 28 cm×3 cm×5 cm blocks of treated timber (Serubo P, Koshii Wood, Japan) are placed in separate dishes of deionized water with a 28×5 cm side facing upwards with the water coming half way up the side of the blocks. An A4 sheet (210×297 mm) of the test material is then placed on each wood block with the face to be tested, i.e. the fluoropolymeric coating face, in contact with the wood. A sheet of polyester film is placed on top of each sample and two more, identical blocks of wood placed on top of each sheet of film to weigh down the sample and ensure good contact between the wood and the sample. Water soaks into each wood block and migrates to the surface of each sample. The samples are left in contact with the soaked wood for 24 hours. At the end of this time, the samples are removed and allowed to dry completely before the hydrohead is measured over the areas when the samples were in contact with the wood blocks to give an average value after contact with wet timber. The test result is expressed as the percentage of the original starting hydrohead which is retained after contact with wet timber from an average of nine samples.

Hydrohead (hydrostatic head) was measured according to EN 20811, 1992 with a rate of pressure increase of 60 cm $H_2O$/min.

Basis weight was measured as per EN 536, 1996 with a sample size of 100 $cm^2$.

The fluorine content in the fluoropolymer layer of the coated samples was measured by dissolving a weighed sample of the coated sheet in concentrated acid to produce a fully mineralized solution, diluting this to a standard volume and then analyzing the resulting solution for its fluorine content by inductively coupled plasma atomic emission spectroscopy. This is a known method frequently used for this specific purpose and is reported in the technical literature, for example in Anal. Chem., 1979, 51 (7), pp 888-895.

Water vapour transmission rate was measured by the dry cup method according to JIS A1324, using a Gintronic GraviTest 6400 permeation test apparatus.

EXAMPLES

Materials
Nonwoven Sheets

Tyvek® Reflex 3563M is a commercially available nonwoven polyethylene sheet having a basis weight (areal weight) of 60 gsm available from E.I. DuPont de Nemours and Company (DuPont), Wilmington, Del. It is a low emissivity membrane composed of a bonded plexifilamentary sheet of polyethylene fibres and a vapour deposited layer of aluminium.

Permo® air is an SMS laminate comprising a polypropylene fleece and two meltblown layers available from Kloeber GmbH, Ennepetal, Germany. The basis weight was 160 gsm.

DB 2112 polyethylene-based microporous film laminate was obtained from DuPont, Contern, Luxembourg. The basis weight was 112 gsm.

Fluoropolymer Emulsions 3M-4701 was obtained from 3M Deutschland GmbH, Neuss, Germany. It is an aqueous dispersion comprising 17-21 wt % of a fluorinated acrylic polymer emulsion, 5-9 wt % of propan-1,2-diol and 1-2 wt % of sodium docusate. The fluorinated acrylic polymer comprises fluorinated side-chains having four or fewer contiguous fluorine-bearing carbon atoms.

Unidyne TG-5601 was obtained from Daikin Chemical Europe GmbH, Düsseldorf, Germany. It is an aqueous dispersion comprising 20-30 wt % of a fluorinated acrylic polymer emulsion, 1-10 wt % of tripropylene glycol and up to 5 wt % of polyoxyetheneglycol alkyl ether. The fluorinated acrylic polymer comprises fluorinated side-chains having six or fewer contiguous fluorine-bearing carbon atoms.

Phobol® CP-S was obtained from Huntsman Textile Effects (Germany) GmbH, Langweid, Germany. It is an aqueous dispersion comprising 20-40 wt % of a fluorinated acrylic polymer emulsion and up to 3 wt % of polyethyleneglycol monostearate. The fluorinated acrylic polymer comprises fluorinated side-chains having six or fewer contiguous fluorine-bearing carbon atoms.

Other Materials

Invadine® PBN surfactant was obtained from Huntsman Textile Effects (Germany) GmbH, Langweid, Germany.

Acetic acid and n-hexanol were technical grade reagents which can be sourced from any suitable chemical supplier such as Sigma-Aldrich.

Coating Process

The fluoropolymer coatings were applied to the nonwoven sheet by the Foulard or 'dip-squeeze' method followed by drying in a tenter oven in a continuous production process. The substrate was unwound from a roll and the moving web passed through an aqueous coating bath so as to fully immerse it. Immediately after leaving the coating bath, the substrate was squeezed between rubber nip-rolls to remove excess coating solution, which ran back into the coating bath. The substrate thus impregnated with coating solution was then immediately passed into a tenter oven to dry the coating using heated air jets impinging on both sides of the coated sheet. On leaving the tenter, the sheet was cooled to room temperature and wound up as a roll of coated sheet. The average residence time in the oven was about 10 seconds, the nip clearance was adjusted to avoid any slipping of the substrate versus the roll and to avoid resulting non-uniform impregnation. The line speed and nip pressure settings were adjusted to obtain the desired fluoropolymer pick-up.

'Wet pick-up' is the percentage increase in weight per unit area of a substrate due to the presence of a wet coating. It was measured by briefly stopping the production line used to apply the coating, taking a sample of known area of the wet, impregnated substrate just after the squeeze rolls and weighing this sample immediately. The wet pick-up can then be calculated knowing the basis weight of the starting substrate. From the wet pick-up and the known solids content of the coating bath, a value for the applied dry coating weight could be calculated.

Example 1

Tyvek® 3563M was coated by the Foulard method with a 2.7 wt % solids aqueous dispersion containing 90 g/L of 3M-4701 fluorinated polymer emulsion at 70 m/min, and the applied coating was then dried in the tenter oven operating at 110° C. The total fluorine present on the coated substrate due to the applied fluoropolymer was 0.144 gsm. The resistance to water of the coated sample on contact with wet timber was measured according to Test Method A.

Example 2

The procedure of Example 1 was followed except that the fluorinated polymer emulsion was a 1.5 wt % dispersion containing 50 g/L of Unidyne 5601 and 5 g/L of n-hexanol. The total fluorine present on the coated substrate due to the applied fluoropolymer was 0.168 gsm. The resistance to water of the coated sample on contact with wet timber was measured according to Test method A.

Example 3

The procedure of Example 1 was followed except that the fluorinated polymer emulsion was 2.5 wt % dispersion containing 50 g/L Phobol CP-S, 6 g/L of n-hexanol, 5 g/L of Invadine® PBN and 1 g/L of acetic acid. The total fluorine present on the coated substrate due to the applied fluoropolymer was 0.102 gsm. The resistance to water of the coated sample on contact with wet timber was measured according to Test Method A.

Comparative Example 1

Tyvek® 3563M was tested for resistance to contact with wet timber without any fluoropolymer coating being applied. The total fluorine present on the substrate was below the limit of quantification of the test, which was 0.0018 gsm.

Comparative Example 2

The procedure of Example 1 was followed except that the Tyvek® 3563M was replaced by Permo® air SMS roofing membrane. The total fluorine present on the coated substrate due to the applied fluoropolymer was 0.992 gsm. The resistance to water of the coated sample on contact with wet timber was measured according to Test Method A.

Comparative Example 3

The procedure of Example 1 was followed except that the Tyvek® 3563M was replaced by DB 2112 microporous film laminated building membrane. The total fluorine present on the coated substrate due to the applied fluoropolymer was 0.448 gsm. The resistance to water of the coated sample on contact with wet timber was measured according to Test Method A.

The test results of all the above examples are shown in Tables 1 and 2.

TABLE 1

| Example | Sheet Type | Basis Wt. (gsm) | Fluorpolymer | Wet coating pick-up (%) | Dry coat weight (g/m²) | Fluorine content (%) | Total fluorine (g/m²) |
|---|---|---|---|---|---|---|---|
| Ex. 1 | Tyvek ® 3563M | 60 | 3M ®-4701 | 13 | 0.14 | 0.24 | 0.14 |
| Ex. 2 | Tyvek ® 3563M | 60 | Unidyne ® 5601 | 13 | 0.120 | 0.28 | 0.17 |
| Ex. 3 | Tyvek ® 3563M | 60 | Phobol ® CP-S | 13 | ? | 0.17 | 0.10 |
| Comp. Ex. 1 | Tyvek ® 3563M | 60 | None | — | 0.00 | <0.003 | <0.0018 |
| Comp. Ex. 2 | Permo ® air (SMS) | 160 | 3M ®-4701 | 71 | 2.04 | 0.62 | 0.99 |
| Comp. Ex. 3 | DB 2112 (MPF) | 112 | 3M ®-4701 | 67 | 1.35 | 0.40 | 0.45 |

TABLE 2

| Example | HHd on Virgin Sheet | HHd after Coating ( | HHd after Wood Contact | % HHd Retained after Wood Contact | Water Vapor Transmission rate (g/m²/day) |
|---|---|---|---|---|---|
| Ex. 1 | 180 | 150 | 150 | 100 | 577 |
| Ex. 2 | 180 | 210 | 190 | 90 | 577 |
| Ex. 3 | 180 | 210 | 210 | 100 | 595 |
| Comp. Ex. 1 | 180 | 180 | 30 | 17 | 670 |
| Comp. Ex. 2 | 100 | 2 | <10* | <50 | |
| Comp. Ex. 3 | >400 | >400** | 200 | <50 | |

HHd = Hydrohead in units of cm $H_2O$
*below the limit of quantification
**above the range of the measuring equipment

What is claimed is:

1. A composite laminate comprising at least one moisture vapor permeable nonwoven sheet having first and second surfaces and a fluorinated continuous polymeric coating on the first surface of the sheet wherein
   (i) the fluorinated polymeric coating is present in an amount such that the total fluorine content of the coated non-woven sheet is from 0.05 gsm to no greater than 0.4 gsm, and
   (ii) the composite laminate, after exposure to wet timber, exhibits a retained hydrohead of at least 60 percent when tested according to Test Method A.

2. The nonwoven sheet of claim 1 wherein the sheet comprises plexifilamentary polyolefin fibers.

3. The nonwoven sheet of claim 2 wherein the polyolefin is polyethylene or polypropylene.

4. The composite laminate of claim 1 further comprising a layer of metal intermediate between the first surface of the polyolefinic sheet and the fluorinated continuous polymeric coating, the laminate having an emissivity no greater than 0.25.

5. The composite laminate of claim 4 wherein the metal is aluminum, tin, zinc, titanium nickel, gold, silver, lead, copper or alloys thereof.

6. The composite laminate of claim 4 wherein the metal is aluminum.

7. The composite laminate of claim 4 further comprising an anticorrosion layer deposited between the metal layer and the fluorinated continuous polymeric coating.

8. A building structure comprising a wall or roofing system comprising wooden sheet board or planks and a composite laminate of claim 1 wherein the polymeric coating is in contact with the wooden board or planks.

* * * * *